Dec. 21, 1926.
A. COPONY
1,611,419
DECKING DEVICE FOR VEHICLES
Filed March 23, 1925    4 Sheets-Sheet 1
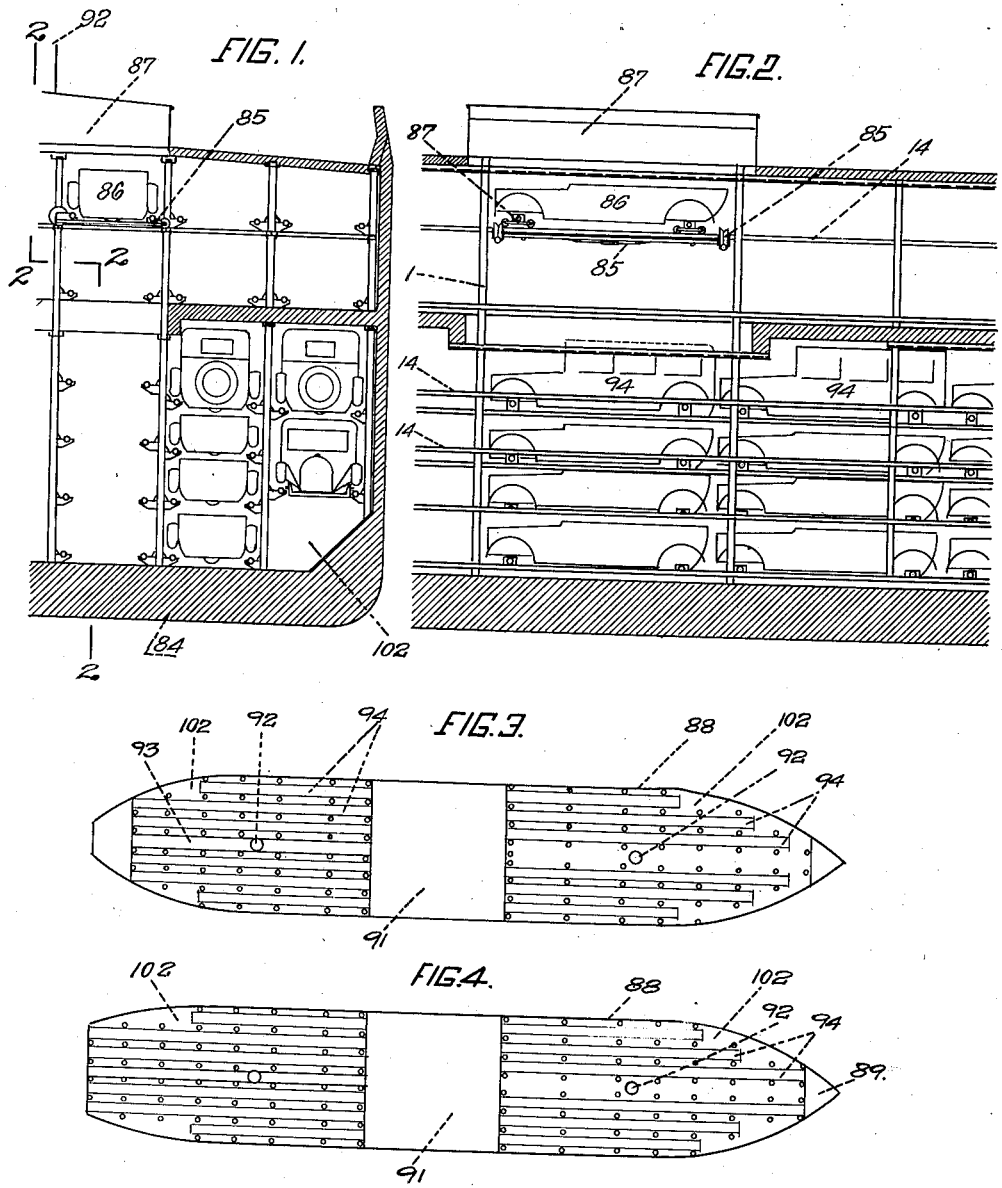
INVENTOR.
Alfred Copony
WITNESSES.

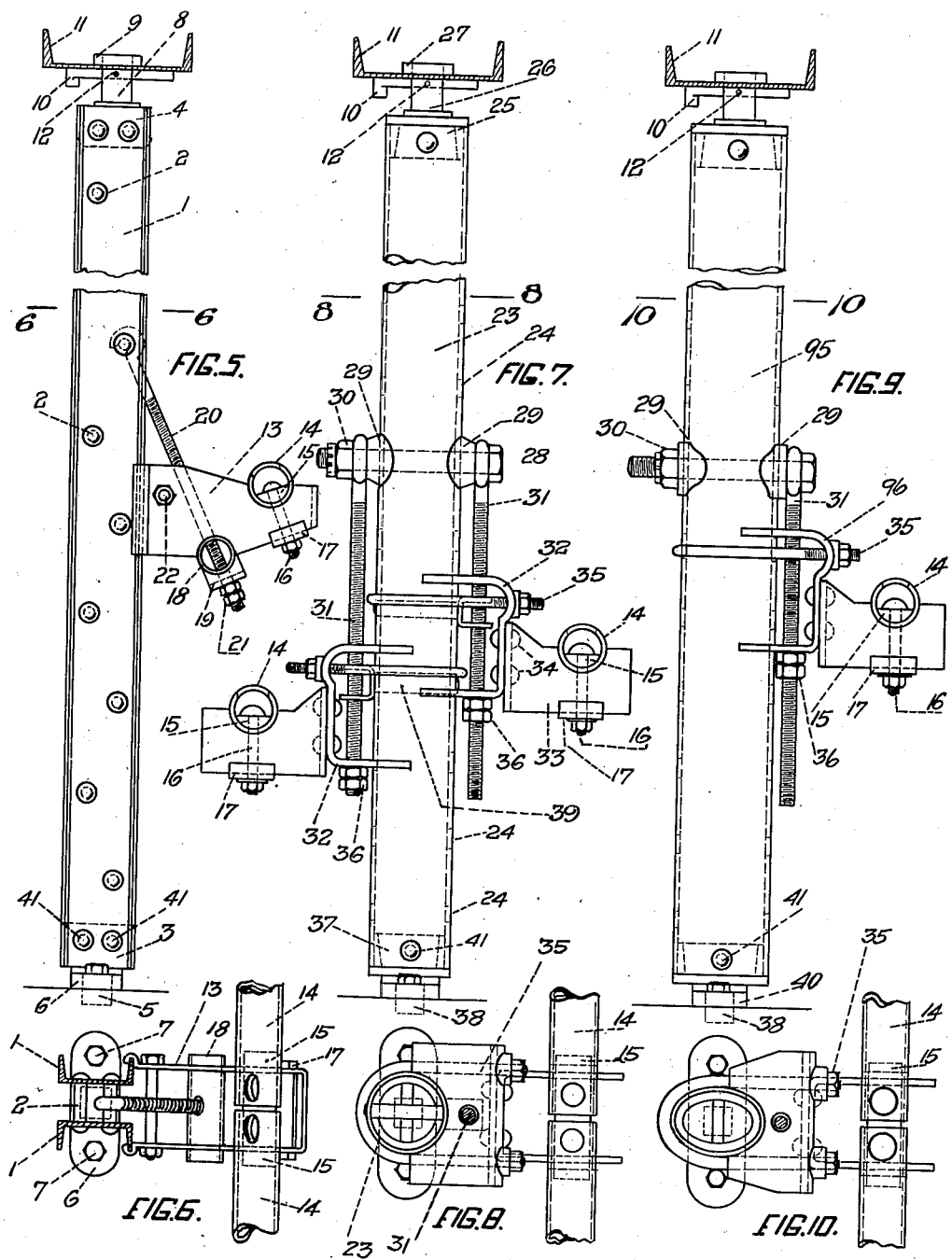

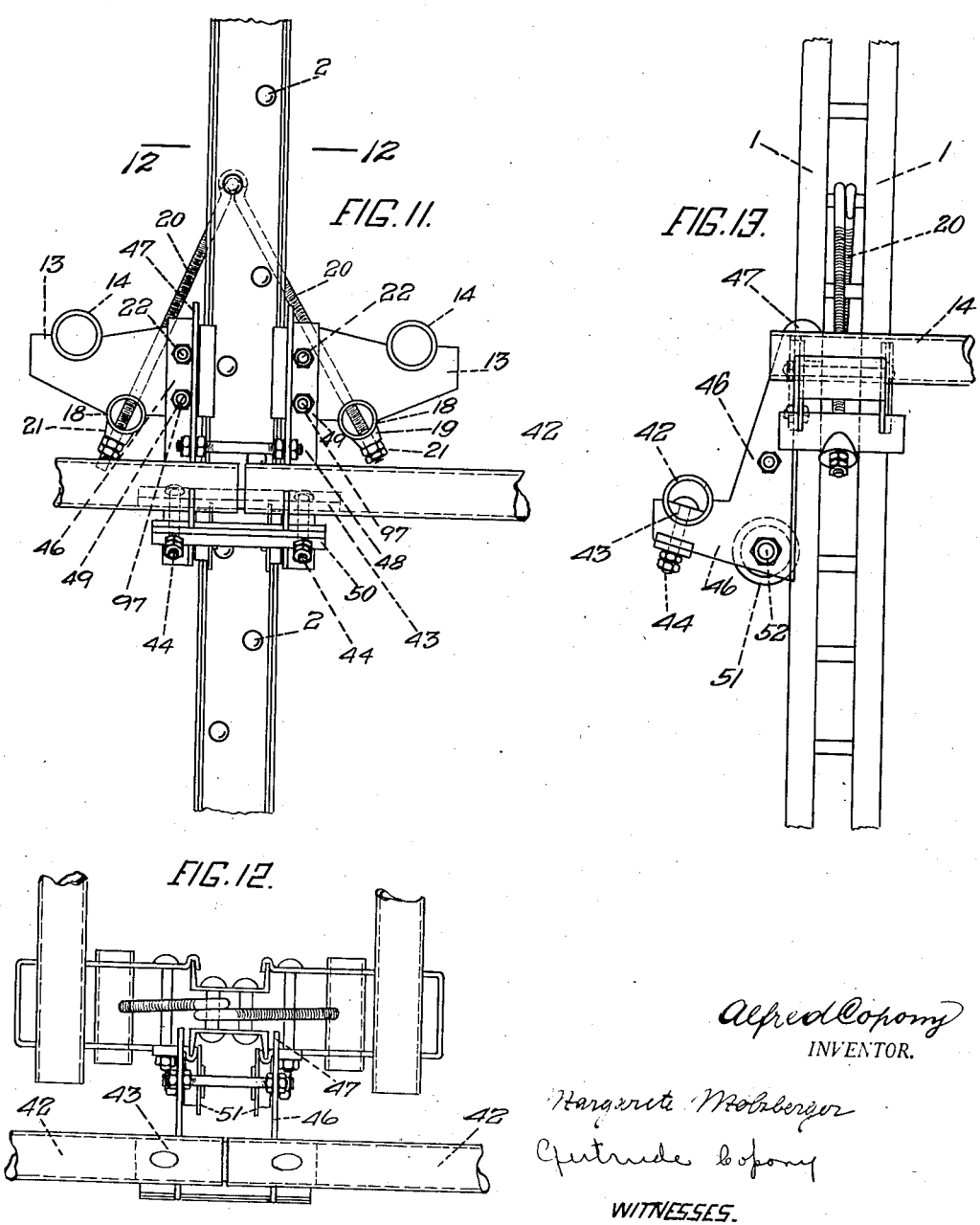

Dec. 21, 1926.                                                    1,611,419
A. COPONY
DECKING DEVICE FOR VEHICLES
Filed March 23, 1925                        4 Sheets-Sheet 4
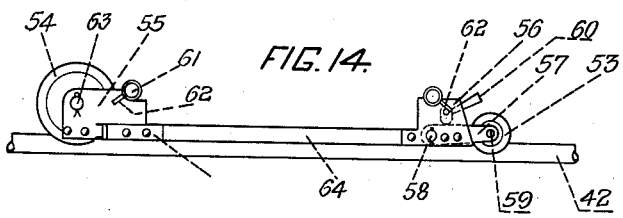
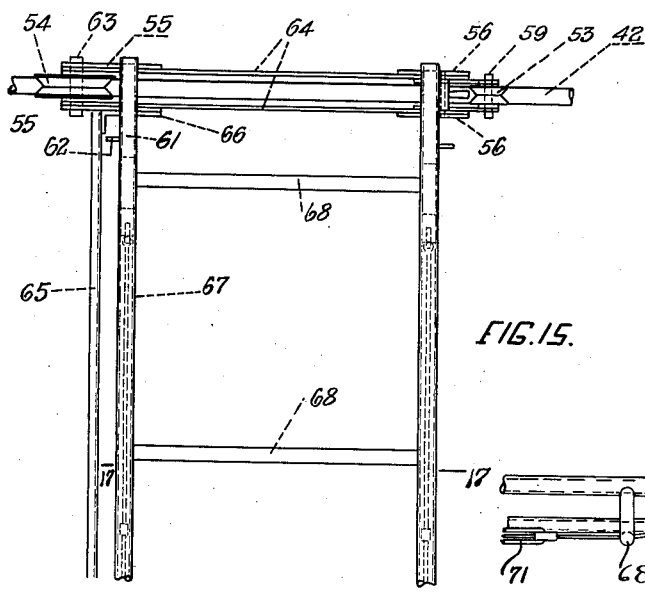
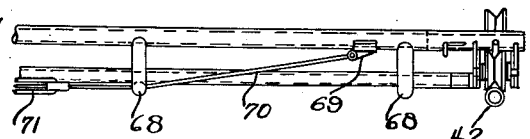
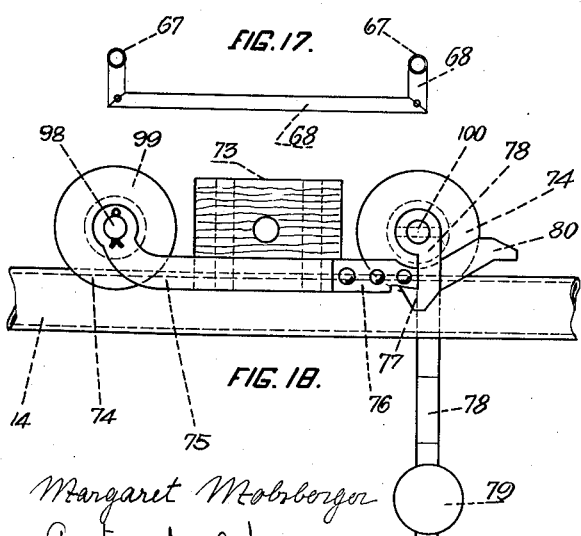
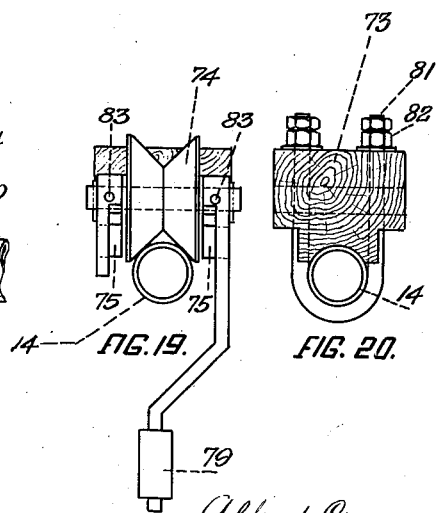

Patented Dec. 21, 1926.

1,611,419

UNITED STATES PATENT OFFICE.

ALFRED COPONY, OF MOUNT CLEMENS, MICHIGAN.

DECKING DEVICE FOR VEHICLES.

Application filed March 23, 1925. Serial No. 17,614.

This invention relates to improvements in decking devices for vehicles in connection with ocean going vessels, in particular, vessels designed by the United States Shipping Board for ocean and Great Lakes traffic and adapted to negotiate the limited draft and over all clearances of the Welland Canal locks.

The main object of my invention is, to provide means whereby it will be made possible, to load automobiles for foreign ports without resorting to the expense of boxing them and carrying them by rail to tide water. My invention will permit the loading of automobiles in Great Lake ports near or at the point of their origin into ocean going vessels, thereby permitting the carriage of such automobiles to their destination by water way exclusively. On arrival at their destination these same automobiles can be delivered to inland points under their own power thus eliminating the additional delay and expense of rail carriage from point of debarkation to final destination. This logically will decrease the cost of shipping automobiles, as it eliminates the cost of boxing entirely, and in addition saves a good part of the freight charges at present incurred by rail carriage to tide water.

An additional saving in time of delivery will be made, between points of origin and destination, as the vexatious delays due to embargoes, lighterage and warehousing will be eliminated.

A further important object of my invention is the possibility of using this decking device in connection with the loading of such vessels in foreign ports with the least possible delay, as it lends itself admirably to the stowage and trimming of bulk cargoes and reduces stevedore charges In addition it provides means to eliminate the shifting of bulk cargoes in case the vessel should heel in severe storms.

The objects of the invention are accomplished by the devices and means described in the following specifications, but it is evident that the same may be varied widely without departing from the scope of the invention as pointed out in the appended claims.

Structures constituting the embodiment of my invention which may be preferred are illustrated in the accompanying drawings, in which Figure 1, shows a cross section through a Shipping Board vessel of the Great Lakes type with my decking device installed and partly loaded.

Figure 2, shows a longitudinal section through part of the vessel along points 2—2—2—2 of Figure 1, with my decking device installed and partly loaded.

Figure 3, shows a horizontal cross section in diagrammatic outline through a Shipping Board vessel about four feet above the keel level through the lower hold.

Figure 4, shows a horizontal diagrammatic cross section through the same vessel through the upper hold.

Figure 5, shows an elevation of my track support stanchion.

Figure 6, shows a plan view of my track support stanchion of a section along lines 6—6 of Figure 5.

Figure 7, shows an elevation of a modified form of my track support stanchion.

Figure 8, shows a plan view of the modified form of my track support stanchion of a section along line 8—8 of Figure 7, with the left hand bracket of Figure 7, left off.

Figure 9, shows an elevation of another modified form of my track support stanchion.

Figure 10, shows a plan view of my stanchion as shown in Figure 9, of a section along line 10—10.

Figure 11, shows an elevation of a track support stanchion as used in the hatch area of the vessel with supports for the transfer track.

Figure 12, shows a plan view of Figure 11, of a section along line 12—12 of Figure 11.

Figure 13, shows a side view of Figure 11.

Figure 14, shows an elevational cross section of my transfer table.

Figure 15, shows half of the plan view of my transfer table as shown in Figure 14.

Figure 16, shows a side view of Figure 15 of my transfer table.

Figure 17, shows a cross section through my transfer table track along lines 17—17 of Figure 15.

Figure 18, shows an elevation of my automobile truck, used in connection with my loading system.

Figure 19, is an end view of Figure 18, while

Figure 20, shows an end view of the axle block, removed from the truck and attached to the track.

The main object of my invention is, to utilize the space of the hold of the vessel to its full capacity without interfering with the possibility of loading and unloading with safety and dispatch. To accomplish this purpose, series of vertical stanchions spaced about 10 feet apart are placed in the vessel, in parallel rows preferably parallel to the axis of said vessel. These stanchions support tubular tracks which have a normal gauge of 4′–8½″ and which are located, one above another.

The stanchions as shown in Figure 5, are built up of stanchion channels 1, placed back to back with a space wide enough to have the radius of gyration of their combined area equal in both directions. These stanchions are equipped at the bottom with a stanchion base 3, which has a square base extension 5, which fits into a corresponding hole of stanchion bed plate 6. This stanchion bed plate is lagged or bolted to the keel plating or floor of the vessel. The upper ends of the stanchion channels 1, terminate in a stanchion top 4, with a stanchion top extension 8, which extends through a corresponding hole through stanchion support channel 11 and a stanchion top collar 9, which is riveted to 11, or in any other way permanently attached thereto. To insert the stanchion into place it is only necessary to engage stanchion top extension 8, with the corresponding hole in stanchion support channel 11, which is permanently fastened to the deck or tweendeck structure of the vessel. Then the lower end of stanchion base extension 5, is placed into the opening of stanchion bed plate 6, thereby clearing an opening for a key 10, in stanchion top extension 8, which in turn is secured by key cotter 12. Throughout the length of the stanchion channels 1, stay rivets 2, are placed at equal distances but in staggered order to maintain the proper distance between the webs of the channels. The flanges of the stanchion channels 1, are engaged by the inside ends of track support bracket 13, thereby permitting a slidable adjustment of track support bracket 13, on opposed flanges of the stanchion channels 1. Hookbolts 20, engaging the shafts of the channel stay rivets 2 between the webs of the stanchion channels 1, engage at their lower end with bracket support tube 18, which rests in a recess of track support bracket 13. A bracket support washer 19 adapted to engage bracket support tube 18, gives a bearing for hook bolt nuts 21, by means of which track support bracket 13 can be raised or lowered at will. As soon as the proper height of the bracket in relation to the floor has been attained, track support bracket 13, can be locked by means of tightening bracket clamp bolt 22. Track 14, consisting of a standard type of pipe about 3½″ in diameter, is cut to standard lengths equivalent to or slightly short of the distance between centers of stanchions, and are provided with two holes diagonally opposed, the upper one of which is larger than the lower one so that it permits inserting of track plate bolt 16, through track plate 15, which is inserted endwise into track 13 before assembly, and which is half round in cross section and fits into the inside diameter of tracks 14. These bolts are secured on the bottom side by means of bracket plate 17, and nuts to track support bracket 13.

Figures 7 and 8, show a modified form of my stanchion construction. In this case the stanchion is made of a pipe 23 equipped at the top and bottom in somewhat similar manner as shown in Figures 5 and 6. Diametrically opposed stanchion holes 24, provide means for inserting stanchion cross bolts 28, with washers 29, and castle nuts 30. This bolt acts as a support of bracket support bolts 31 which give a more direct lift and adjustment for outside track support bracket 32, to which the inside track support bracket 33 is riveted by means of rivets 34. The method of fastening track 14 to the inside track support bracket is identical with that described and shown in Figures 5 and 6. An additional means of fastening track support bracket 32 to stanchion 23, is provided in stanchion U-bolt 35 which is tightened against a shoulder shaped part of 32. Furthermore, a clevis bolt 39 which extends through diametrically opposed holes 24, engages bracket support bolt 31 thereby counteracting any tendency that might arise from outside track support bracket 32 sliding along the circumference of pipe stanchion 23, when loosely connected under load and in a heavy sea way.

Figures 9 and 10 show another modified form of my stanchion construction. It differs from the construction shown in Figures 7 and 8 in the oval cross section of the stanchion 95 which does away with the necessity of employing clevis bolts 39 as shown in Figures 7 and 8, as the form of the stanchion cross section will prevent the tendency, of the outside track support bracket 96, to circular movement, around the stanchion 95, Figures 9 and 10.

Figures 11, 12 and 13, show the methods of attaching the transfer table track under the hatch opening to track support brackets 13. Track support brackets and stanchions are the same as shown in Figures 5 and 6, with the sole exception that auxiliary bolt holes 97 are provided for in track support bracket 13, which are used to connect transfer track bracket 46, by means of bracket clamp bolt 22 and transfer track bracket auxiliary bolt 49, through hole 97, to track support bracket 13. An additional transfer track bracket stay bolt 48 is used to connect right and left transfer track brackets 49 with each other. The rail joint of transfer table track 42 is made in a similar manner as shown with track 13 in Figures 5, 6, 7, 8, 9 and 10. Transfer table track bolts 44 connect by means of transfer table track plate 43 and transfer track bracket plate 50, transfer table track 42 to transfer track bracket 46. An additional support to transfer table track bracket 46 is given by transfer track bracket wheel 51, which is journalled on transfer track bracket wheel axle 52, which runs on the flanges of stanchion channels 1. It will be seen from this arrangement that the distance between the center of the transfer table track 42 and center of track 14 can always be maintained alike provided that opposed brackets 13 are on the same level. As shown in Figures 11, 12 and 13, the end of track 14 is not attached in the manner shown in Figures 5 and 6, to track support bracket 13. The reason for this is that the hollow space inside of track 14, is used for locking trussed tracks 67, Figures 14, 15, 16 and 17, by means of bolts 61 to track 14. After all the automobiles are loaded this track 14 is bolted to track support brackets 13 by means of U-bolts going over the top of track 14 which is not shown in the drawing.

Figures 14, 15 and 16, show the transfer table, traveling on the transfer table track 42, right beneath the hatch of the vessel which is used to distribute the stripped automobiles 86, Figures 1 and 2, onto the different tracks that are provided for holding them in transit. It consists of transfer table cross beams 64 riveted at one end to the bull wheel bracket 55 while the opposite end connects with pony wheel bracket 56. The bull wheel brackets 55 are equipped with a bull wheel axle 63 secured at its ends by cotter pins, and provides bearing for a transfer table bull wheel 54. The upper part of bull wheel bracket 55 is shaped to retain the ends of trussed tracks 67 which rest loosely in bracket 55. A similar arrangement is made in regard to pony wheel bracket 56. Bull wheel bracket 55 is further connected at its lower end by means of truck cross tie angle 66 to a truck cross tie 65, which connects with the bull wheel bracket at the opposite end of the transfer table. Pony wheel bracket 56 is equipped with a pony wheel swivel pin 58, providing bearing for pony wheel arms 57, which are connected at the right hand side as shown in Figure 14, by means of pony wheel axle 59 which provide a bearing for transfer table pony wheel 53. An eccentric 60, with an arm extension for operating it is journalled in pony wheel bracket 56 and rests with its under surface against pony wheel arms 57. Trussed tracks 67 provided with cross ties 68, offset, to clear the differential housing and the oil pan of an automobile when resting upon it, are stiffened against bending when under load by means of truss rod bracket 69, truss rods 70 and truss rod turn buckles 71, are resting free on bull wheel bracket 55 and pony wheel bracket 56. Where a light type of automobile is loaded these tracks 67 can be replaced by ordinary heavy piping of a suitable size without any special trussing or cross tying. The open ends of trussed tracks 67, or any plain tubing used to take its place are equipped with track bolts 61, and track bolt extensions 62 which extend through a slot in the pipe and are used to lock the trussed tracks either temporary, when loading tracks 14, or permanently, when carrying automobiles in transit, in which case trussed tracks 67 become a removable section of track 14, to track 14.

Figures 18 and 19, show the automobile truck used at each axle stub when loading the automobile into the vessel. It consists of a wooden block 73 bored out to fit over the axle of the automobile after the wheel has been removed, shaped half round on the bottom, to fit track 14, see Figure 20, and gained out at the outside of the bottom surface to provide a rest for automobile truck frame 75. This truck frame 75 is attached to axle 98 which journals permanent automobile truck wheel 99. The right hand side of automobile truck frame 75, is provided with an automobile truck frame catch 76, which engages pawl 77, attached to pawl arms 78, which in turn are pinioned and fastened to detachable wheel axle 100 by pawl arm pins 83, the former providing a bearing for detachable automobile truck wheel 74. One of the pawl arms is extended downwardly and offset, and provided with pawl arm counter weight 79. It will be readily seen that when this truck is loaded and the automobile has been pushed into its permanent place when in transit, it is possible to drop the axle block 73 onto track 14, by pushing the counter weight 79, to the right and upward which disengages truck frame pawl 77 from truck frame catches 76. Truck frame 75 will swing downward straddling track 14 and will thereby eliminate the possibility of dropping off the track. Counterweight 79 will fill the same function in regard to detachable automobile truck wheel 74. It then only remains to bolt axle block 73, to track 14, by means of U-bolts 81 and nuts 82, as shown in Figure 20.

In preparation of loading a full cargo of automobiles and assuming that the vessel has been stripped of this internal special equipment, the man in charge of loading will proceed as follows:

First all the removable stanchions, which are of standardized length for the upper hold as well as for the lower hold are put in place by inserting them into the proper holes of stanchion support channels 11, which are permanently fastened to the deck beams of the upper hold, for the upper hold, and the floor beams of the upper hold in the lower hold, for the lower hold. By stepping them into stanchion bed plate 6 and securing the stanchions on top with keys 10 and cotter pins 12 these stanchions are locked in place. Then track support brackets 13 are slipped over the flange of stanchions 1 and slid into their approximate position, required by the over all dimensions in height of the automobiles that are to be loaded. Hook bolts 20 are then placed as shown in Figure 5, or their equivalent as shown in Figures 7, 8, 9 and 10 are used when the round or oval type of stanchion is used. Then the tracks 14, which are of standard length are placed on the track support brackets 13 or their equivalent as shown in Figures 7, 8, 9 and 10, and bolted down as shown in the drawings.

The stanchions that are used in the hatch opening are in length equivalent to the full height between deck and keel cover plates as shown in Figures 1 and 2, but they are intermediately supported by stanchion support channels 11 at the hatch opening between upper and lower hold.

Thereafter transfer track brackets 46 are attached to those track support brackets that are located on the hatch stanchions and fastened in the manner as shown in the Figures 11, 12 and 13. The transfer table tracks 42 are fastened to transfer track brackets 46 in the manner shown in the drawing. It goes without saying that none of the tracks 13 will be allowed to cross the transfer track at this stage of preparation for loading.

Then the transfer table as shown in Figures 14, 15 and 16, is placed on the transfer track by means of the vessel's loading boom which is not shown in the drawing.

The loading of automobiles proceeds as follows:—

An automobile is lifted from the dock by means of the ship's boom onto any convenient place of the vessel within reach of the boom and deposited on wooden horses that keep the wheels off the deck. The wheels are then removed, and in case of an open car, the top of the car is removed including wind shield. The steering wheel of the automobile is disconnected from the dash or instrument board and dropped onto the seat. Then the springs of the automobile are compressed until the frames ride on the axle and then tied to the frame of the automobile in such a manner that the automobile presents the lowest possible height consistent with the space available. Wheels, wind-shield and top are packed into the space of the automobile which is normally occupied by the passengers, or, where this is impossible, they are stored in such parts of the hold that are not available, due to their lack of proper clearances for automobile loading. Such places are in the peak of the vessel, at the termination of the tracks, marked 102, Figures 3 and 4, or near that part of the vessel where the keel adjoins the side of the vessel, Figures 1 and 2. Another vacant space for such purposes is to be found near the shaft tunnel aft of the engine room 91, or between the tracks nearest the vessel's center, fore and aft of the engine room which is left free due to interference of the masts 92 with the placement of tracks nearer together. Then the automobile trucks as shown in Figures 18 and 19 are placed on the trussed tracks of the transfer table, the automobile is lowered onto them and the axle block 73 is slipped over the axle, and held in place by the axle nuts of the automobile. Then the transfer table is pushed by hand or any other convenient means to the outermost track near the ship's side. It might be convenient to provide braking means on said transfer table to more easily control the transfer table in its movements. As soon as the trussed tracks of the transfer table are in alignment with tracks 14, the bolts centered in the ends of trussed tracks 67 are locked with tracks 14 and the automobile pushed off the transfer table, to the furthermost part of the vessel. There the automobile trucks are released by lifting pawl arm counterweight upward, both sections of the automobile truck are removed, replaced on the transfer table and the latter is moved back into the loading position. Then the axle blocks 73 are bolted to the tracks as shown in Figure 20. This method of loading is followed out until the whole length of the tracks are covered. The last section left uncovered is the opening covered by the path of the transfer track. In this case the last automobile is loaded on the trussed tracks, shifted into the space left void, locked by means of the bolts with track 14, then eccentric 60 of transfer table Figures 14, 15 and 16 is tipped, so that the pony wheel tips upward and lowers the frame of the transfer table, thus clearing the trussed track, and the transfer table can be moved out from under the trussed track which then becomes an integral part of track 14.

Where the clearances are very limited, due to a series of very high cars being loaded above another, then there is the possibility that cross tie 68 of trussed tracks 67 might be in the way of the car below. In such a case plain tracks would be used and to reinforce these it might be necessary to place intermediate auxiliary stanchions in the hatch opening to brace the excessive length of track against strains due to rolling of the vessel. This can be done without any trouble, by providing the necessary recesses in the stanchion support channel 11 at the hatch opening and providing means for bracing them on top. In this case one auxiliary stanchion is placed before and the other one after the track is loaded. In the process of further loading a new trussed track is placed on the transfer table and the loading proceeds. After a whole level of the tracks has been loaded, the transfer tracks are shifted to the next lower level and loading continued. If the clearance left between the first row of automobiles and the deck beams is excessive and the probability of lack of, or short clearances is apparent for the next row of automobiles to be loaded, then it is an easy matter to raise the tracks despite the load of automobiles thereon, by tightening up on the nuts 21 of hook bolts 20 so that the clearance is reduced to the lowest possible limit. In practice it will be preferable to start loading from the top, so that nuts, bolts or any other part of an automobile dropped by carelessness will not injure the car below. It stands to reason that in loading all of the hatches can be served at the same time, and that both sides of the ship from amidship outward should be loaded simultaneously. This will not only facilitate the speed of loading but it will also have a tendency to keep the vessel in trim and on an even keel so that there will not be an excessive amount of physical labor in pushing the transfer table and the automobiles into their respective places.

After having described the loading of the vessel, it is an easy matter to grasp the reverse operation of unloading which is identically the same as used on loading. However, I want to point out that there is slight modification of the operation of the automobile truck when unloading the cars. In this case U-bolt 81 which holds axle block 73 in place is removed, the separable parts of the truck are placed on track 14, fore and aft of the axle block 73, Figures 18 and 19. Then automobile truck frame 75 is pulled up horizontally, until ends of truck frame 80 can be engaged with a wide lipped crow bar, wide enough to engage both parts of the truck frame simultaneously, the crow bar being placed parallel with and on top of the tracks. By pushing down on the handle of the crow bar, the automobile truck frame 76 lifts the axle block clear off the track, and pawl 77 of pawl arm 78 engages truck frame catch 76. The automobile is then on its trucks.

A more effective use can be made of the U. S. Shipping Board vessels of the lake type, by grouping the power machinery in the economically less efficient aft- or stern part of the vessel, and grouping the fuel tanks in the forward part or bow port of the vessel. Proper trim of the vessel while in transit can be obtained by filling the exhausted oil tanks with water. This will leave the space occupied by the engine room free for loading by my system from the hatches now in use, thereby giving an increased capacity for loading of approximately 12% without in the least interfering with the use or structure of the vessel now above the engine room.

In using the decking system in connection with loading and unloading of bulk cargo, for instance, coffee in sacks, hides in bundles, coal, potters' clay, grain or lumber in bulk the procedure is as follows:—

A dump truck, or any other vehicle adapted to the temporary carriage of such cargo is provided with wheels adapted to travel on and engage with my round tubular rail. In case no specially adapted wheels for the locomotion of the dump truck on the tubular tracks are available, the automobiles trucks shown in Figure 18 can be substituted for that purpose.

The loading and unloading will then proceed as follows:—

The cargo is dropped by means of the boom onto the truck, the truck is being pushed into place and dumped after which it will be hauled back to the hatch opening for another load. In this case the use of the transfer truck and track will be only limited since 90% of the load can be handled from that part of the trackage that is direct under the boom and below the hatch opening. The bulk freight that can be dumped will have a tendency to overflow towards the sides of the vessel. Only the last part of the cargo must be loaded by means of the transfer track and the uppermost track in that tier of tracks near the side of the vessel.

In order to provide against shifting of bulk cargo like grain, boards placed lengthwise of my stanchions and on end, and then covered by the bulk cargo without any further fastening will prevent any tendency to shifting of the load.

In inter lake shipments or short hauls a stage might be reached when the cost of removing the wheels or stripping the top off the automobile might outweigh the economy of space attained thereby. In such a case it will be more economical to change my track from the tubular form to a channel shaped track with the flanges turned upward, thus providing means for loading cars with the wheels on. This will mean the elimination of the use of my automobile truck and bring about a different fastening of the automobile wheels to the track, but otherwise the system of loading employed will be unchanged.

While I have shown and described in detail the specific embodiment of my invention, it is to be understood that this showing and description is illustrative only and for the purpose of rendering my invention more clear, and that I do not regard the invention as limited to the details of construction illustrated, or any of them, except in so far as I have included such limitations within the terms of the following claims, in which it is my intention to claim all novelties inherent in my invention broadly as well as specifically.

Having thus described my invention, what I claim as new and desire to secure by Letters Patent is:—

1. In an automobile loading device or the like for vessels, the combination of a plurality of stanchions, arranged in parallel vertical rows, a plurality of rails bracketed to said stanchions arranged in parallel substantially horizontal rows, and holding means to hold automobiles to said rails, between said stanchions.

2. In an automobile loading device or the like for vessels, the combination of a plurality of stanchions, arranged in parallel vertical rows, a plurality of rails arranged in parallel rows and adjustably bracketed to said stanchions, and holding means to hold automobiles to said rails between said stanchions.

3. In an automobile loading device or the like for vessels, the combination of a plurality of tracks, spaced adjustably and vertically above another, in combination with means for holding said tracks in proper relation to said vessel, and holding means to hold automobiles to said tracks.

4. In an automobile loading device or the like for vessels, the combination of a plurality of tracks grouped and adjustably spaced above another, a plurality of said groups being placed parallel to another, in combination with means for holding said tracks in proper relation to said vessel and holding means to hold automobiles to said tracks.

5. In an automobile loading device or the like for vessels, the combination of a plurality of removable tracks spaced adjustably and vertically above another, in combination with removable means for holding said tracks in proper relation to said vessel, and holding means to hold automobiles to said tracks.

6. In an automobile loading device or the like for vessels, the combination of a plurality of removable tracks grouped and vertically adjustably spaced above another, with a plurality of said groups being placed parallel to another, in combination with removable means for holding said tracks in proper relation to said vessel, and holding means to hold automobiles to said tracks.

7. In an automobile loading device or the like for vessels, the combination of a plurality of removable tracks grouped, and vertically adjustably spaced above another, with a plurality of said groups being placed parallel to another, in combination with means for loading said tracks with automobiles, and means for fastening said automobiles to said tracks.

8. In an automobile loading device or the like for vessels, the combination of a plurality of removable tracks grouped and vertically adjustably spaced above another, with a plurality of said groups being placed parallel to another and means for loading said tracks direct from a hatch opening of said vessel.

9. In an automobile loading device or the like for vessels, the combination of a plurality of removable tracks grouped and vertically adjustably spaced above another, with a plurality of said groups being placed parallel to another, and means for loading said tracks direct from a hatch opening where said hatch opening is vertically above said tracks, and indirectly from said hatch opening where said hatch opening is not above said tracks.

10. In an automobile loading device or the like for vessels, the combination of a plurality of removable tracks grouped and vertically adjustably spaced above another, with a plurality of said groups being placed parallel to another, and means for loading said tracks directly from a hatch opening, where said hatch opening is vertically above said tracks and indirectly from said hatch opening by means of a transfer table, where said hatch opening is not above said tracks.

11. In an automobile loading device or the like for vessels, the combination of a plurality of removable tracks, grouped and spaced adjustably and vertically above another, with a plurality of said groups being placed parallel to another, in combination with a transfer table adapted to carry a section of said tracks, and means for locking said section of tracks into said tracks.

12. In an automobile loading device or the like for vessels, the combination of a plurality of removable tracks grouped and vertically adjustably spaced above another, with a plurality of said groups being placed parallel to another, in combination with a transfer table adapted to carry a section of said tracks, means for locking said section of tracks into said removable tracks, and means for removing said transfer table from under said section of tracks after said section of tracks had been locked into place.

13. In an automobile loading device or the like for vessels, the combination of a series of tracks with axle blocks adapted to fit said tracks, means for fastening said axle blocks to said tracks, and means for fastening said axle blocks to automobiles.

14. In an automobile loading device or the like for vessels, the combination of means for loading an automobile onto a track, axle blocks adapted to fit said tracks and said loading means, said loading means being adapted to engage said track, and carry said axle blocks connected to said automobile clear of said track, means for lowering said axle block onto said track, and means for removing said loading means after said axle block is in contact with said track.

15. In a loading device or the like for vessels, the combination of a plurality of removable tracks, grouped and vertically adjustably spaced above another, with a plurality of said groups being placed parallel to another, conveying means adapted to travel on said tracks and means adapted to load said conveying means when placed under the hatch opening of said vessel.

16. In a loading device or the like for vessels, the combination of a plurality of removable tracks, grouped and vertically adjustably spaced above another, with a plurality of said groups being placed parallel to another, conveying means adapted to travel on said tracks and means adapted to convey said conveying means to such portions of the track that are not directly under the hatch opening.

In testimony whereof, I affix my signature.

ALFRED COPONY.